Inventor:
Guy Bellows, Jr.,
by Harry E. Dunham
His Attorney.

Patented Mar. 10, 1942

2,275,837

UNITED STATES PATENT OFFICE 2,275,837

BATTERY CHARGING SYSTEM

Guy Bellows, Jr., Erie, Pa., assignor to General Electric Company, a corporation of New York Application November 13, 1940, Serial No. 365,514

8 Claims. (Cl. 171—314)

My invention relates to battery charging systems and has for its object simple and reliable means for automatically connecting the charging generator to the battery in response to the voltage of the generator and for disconnecting the generator in response to a discharge current.

In carrying out my invention in one form, I provide a relay for controlling the operating coil of the battery charging switch, this relay being provided with three core legs and having an armature on the middle leg biased by a spring into engagement with one of the outer legs whereby the relay contacts are separated and the charging switch maintained open. On the two outer legs are voltage coils while on the middle leg is a series coil in the battery charging circuit which coil operates upon reverse current to cause the armature to move to its biased position and thereafter assist the spring in holding the armature in that position.

Figure 1:
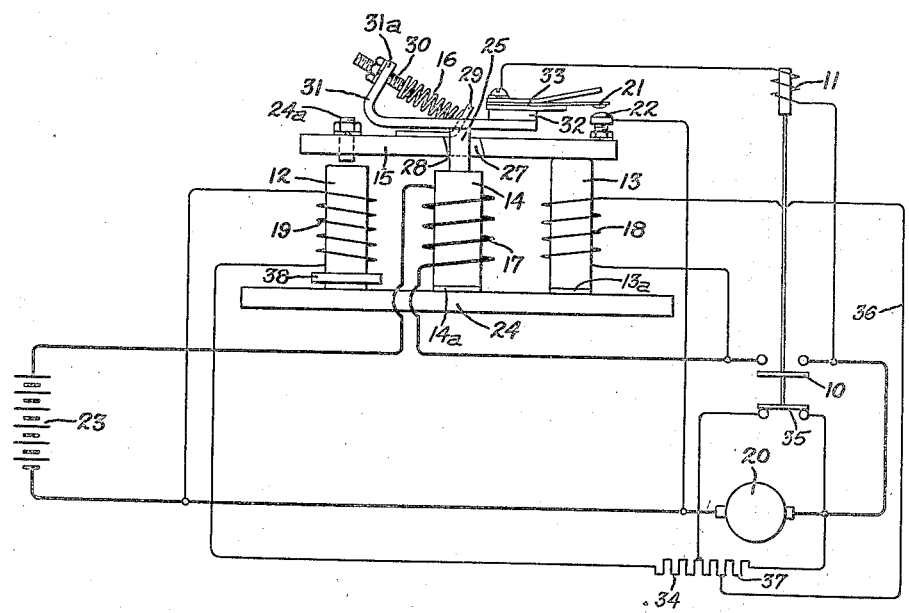
Figure 2:
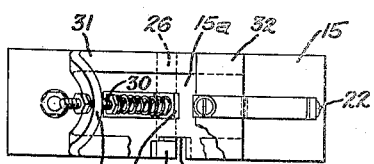
Figure 3:
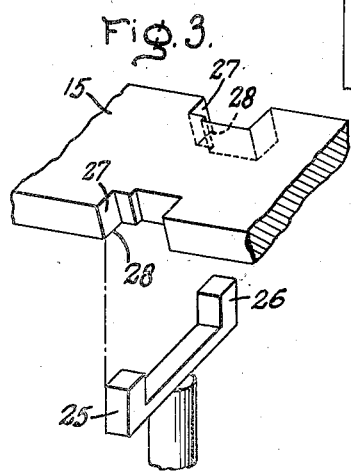

For a more complete understanding of my invention, reference should be had to the accompanying drawing, Fig. 1 of which is a diagrammatic view of a battery charging system embodying my invention, Fig. 2 is a plan view showing details of the control relay, while Fig. 3 is a fragmentary view showing details of construction.

Referring to the drawing in one form of my invention the normally open charging switch 10 has its operating coil 11 controlled by a relay provided with an E-shaped core having two outer legs 12 and 13 and a middle leg 14. On the middle leg 14 is pivotally mounted an armature 15 which is biased by a compression spring 16 in a clockwise direction so that its right-hand end, as seen in Fig. 1, is normally in engagement with the leg 13. On the middle leg 14 is a series coil 17 connected in the charging circuit with the switch 10. On the leg 13 is a differential voltage coil 18 connected across the switch 10 and on the leg 12 is a voltage coil 19 connected across the charging generator 20.

The armature 15 carries on its right-hand end, as shown, a movable contact 22 arranged to engage a stationary contact 21 when the armature is moved counter-clockwise about its central pivot to bring its left-hand end into engagement with the leg 12. This engagement of the contacts 21 and 22 connects the operating coil 11 across the generator 20 whereupon the coil 11 closes the switch 10 which connects the charging generator 20 to the battery 23.

In the operation of the relay the shunt coil 19 generates a flux which is proportionate to the generator voltage and flows through the bottom core leg 24 through the cores 13 and 14 in parallel with each other and then through the armature 15 and back to the core 12, the flux dividing in the cores 13 and 14 in proportion to the relative air gaps or magnetic reluctances of these cores. The component of the shunt flux from the coil 19 in the core 14 applies a counterclockwise force to the armature 15, i. e., in a circuit-closing direction, whereas the portion of the shunt flux in the core 13 applies a circuit-opening force to the armature and tends to hold the armature sealed against the end of the core 13 as shown in the drawing.

When the generator voltage is less than the battery voltage, the switch 10 at that time of course being open, the differential coil 18 sets up a magnetic flux in the core 13 in the same direction as the component of the shunt winding flux in that core. In other words, at this time the differential coil assists the shunt flux in holding the armature sealed against the core 13. The division of flux between the cores 13 and 14 is so arranged by adjustment of the air gaps and hence reluctances of these cores that the shunt coil cannot pick up the armature so long as there is a differential voltage applied to the coil 18 in a direction to assist the shunt flux. Also, the adjustment is such that when the generator voltage exactly equals the battery voltage and consequently no voltage is applied to the coil 18, the armature is still held sealed against the core 13 by the shunt flux in that core. However, when the generator voltage increases to a value slightly above the battery voltage, the switch 10 still being open, the coil 18 will buck with its reversed flux the shunt flux in the core 13 to such an extent that the holding force on the armature is overcome and the armature is moved into engagement with the core 12 to close the circuit. For example, the relay may be calibrated so that its contacts will close when the generator voltage is one and one-half volts higher than the voltage of the battery. It is contemplated that the generator will be driven at a variable speed, for example, from the axle of a railway vehicle, the voltage of the generator of course increasing with increasing speed up to the maximum voltage of the generator.

By varying the relative reluctances of the cores 13 and 14, which is done conveniently by varying the air gaps between the cores 13 and 14 and the magnetic arm 24, the amount of shunt flux in the core 13 may be changed to vary the amount of opposing differential flux required to cause the relay to pick up. As shown, shims 13a and 14a, made of a suitable non-magnetic material such as brass, are provided between these cores and the member 24. Any such change in the air gap ratio between the cores 13 and 14 does not affect the drop-out or circuit-opening characteristics of the relay. This drop-out setting can be adjusted by means of an adjusting screw 24a extending through the armature 15 in position to engage the end of the core 12 when the armature is picked up. This screw is made of a non-magnetic material such as brass or stainless steel.

The series coil 17 is connected in the charging circuit in such direction that when the generator is charging the battery, the series coil sets up a magnetic flux in a direction to assist the coil 19 in holding the armature in its picked-up position. The flux through the series coil is mainly through the legs 12 and 14 because of the air gap at this time between the armature and the core 13.

In the event of a reversal of current flow in the generator circuit, the relay contacts and the switch 10 being closed, such as might be caused by decreased speed and voltage of the generator, the series coil reverses and opposes the shunt coil 19. Upon a predetermined value of reversed current, the net holding force on the armature is reduced to such a low value that the spring 16 snaps the armature back to its open position shown in the drawing. This deenergizes the coil 11 and the switch 10 opens to open the charging circuit.

An important feature of this device is that in the event of a reversed current or battery discharge current of high value, such as might be caused by a reversed polarity of the generator, the reversed current, after effecting the release of the armature and its movement to its open-circuit position, thereafter applies a magnetic force, assuming that the switch 10 should remain closed, to the armature, tending to hold the armature in its open-circuit position. The series flux then is mainly through the circuit formed by the legs 13 and 14. Thus if the holding force of the series coil on the armature were not reversed upon movement of the armature to its open-circuit position, its force might increase to such a high value during the short interval required for the switch 10 to open as to overpower the coil 19 and return the armature to its closed position. In such case the reverse current condition would not be terminated.

Additional details of construction of the relay will be clear from Figs. 2 and 3 taken in connection with Fig. 1. The armature 15 is provided with a narrow central portion 15a which fits loosely between two projections 25 and 26 on opposite sides of the middle leg 14. It will be noted that the narrow portion 15a is formed in the armature by forming a slot 27 on each side of the armature at its center. As seen in Fig. 1, the side walls of these slots are inclined somewhat toward the left hand from the bottom edge upward so as to form a bearing edge 28 on the left hand wall of each slot. These two bearing edges on the side walls of the two slots are held against the left-hand sides, as seen in Fig. 1, of the projections 25 and 26 by the pressure exerted by the spring 16.

As shown, the spring has its lower right-hand end bearing against a bracket 29 secured to the top of the armature. The other end of the spring bears against an adjustable bolt 30 which is threaded and passes through a threaded hole in a bracket 31. This bracket 31 is substantially U-shaped with its two arms in substantially horizontal positions as seen in Fig. 1 and secured centrally to the tops of the projections 25 and 26. The base portion 31a of the bracket is bent upward and over toward the right-hand so as to direct the spring pressure against the bracket 29. On their ends the arms of the bracket carry a cross plate 32 made of electrically insulating material to which is secured a flexible contact arm 33 bearing the stationary contact 21.

For purposes of stabilization and calibration, I have shown a resistance 34 connected in circuit with the shunt coil 19. By means of an interlock switch 35 connected to and operated by the coil 11, the right-hand portion of this resistance is short-circuited. This permits an increased energization of the shunt winding until the switch 10 is closed, at which time the switch 35 is opened and the entire resistance 34 inserted in the circuit with the shunt coil. This insertion of the resistance decreases the excitation of the shunt coil and consequently causes the armature to be released at a lower value of reversed series coil excitation.

Also, I have shown one terminal of the differential coil 18 connected through a conductor 36 to an intermediate point on the resistor 34, whereby when the switch 10 closes the differential coil is connected in series with the section 37 of the resistance. The voltage across the resistance section 37 maintains a current of low value in the differential coil in a direction to product a flux in the core 13 in the same direction as the shunt coil flux in the core 13. Consequently, the differential coil is ready to establish a seal between the core 13 and the armature as soon as the relay drops out. This avoids the inductive lag otherwise required to build up a differential coil current after the relay has dropped out. In other words, the small amount of flux set up by the differential coil just before the switch 10 closes is reversed after switch 10 is closed by the energization of the differential coil by the voltage across the resistor section 37.

I have also found that increased stability of the relay against drop out in response to battery discharge current surges of short duration may be effected by applying a copper ring 38 around the core 12. This copper ring is a single-turn closed-circuit conductor and tends to oppose any sudden change in the flux in the core 12.

Preferably, the voltage of the generator is so selected that its voltage is less than the battery voltage until after the generator voltage passes the knee of the generator characteristic curve, it being understood that the generator is a shunt generator. This avoids the possibility of a generator voltage in case the switch 10 fails to close much higher than the battery voltage, whereby the reversed excitation of the differential coil might completely overcome the shunt flux in the core 13 and establish a flux in the reverse direction sufficiently strong to maintain the armature at its open-circuit position as shown.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. A battery charging system comprising a generator, a normally open switch for connecting said generator in a charging circuit with a battery, an operating coil for closing said switch, an E-shaped magnet core, an armature pivoted on the middle leg of said core, switching means operated by said armature for controlling said coil to open and close said switch, a spring for biasing said armature toward one of the outer legs of said core, a differential voltage coil on said one outer core leg connected across said switch, a voltage coil on the second of said outer core legs connected across said generator, and a series coil in said charging circuit on the middle leg of said core, said series coil being energized to assist said voltage coil in holding said armature against the bias of said spring in position to energize said coil and close said switch during battery charging operation but to oppose said voltage coil during battery discharging operation whereupon said armature moves in accordance with the bias of said spring to deenergize said coil and open said switch, said series coil then assisting said spring to hold said armature in its biased position in response to discharging current in the event said switch fails to open.

2. A battery charging system comprising a generator, a normally open switch for connecting said generator in a charging circuit with a battery, an operating coil for closing said switch, an E-shaped magnet core, an armature pivoted on the middle leg of said core, a stationary contact, a cooperating movable contact carried by said armature, connections for connecting said contacts in circuit with said coil, a spring for biasing said armature into engagement with one of the two outer legs of said core with said movable contact disengaged from said stationary contact, a differential voltage coil on said one outer core leg connected across said switch, a voltage coil on the other of said outer core legs connected across said generator, and a series coil in said charging circuit on the middle leg of said core, said series coil being energized to assist said voltage coil in holding said contacts in engagement during charging but to oppose said voltage coil during discharging whereupon said armature moves to separate said contacts in accordance with the bias of said spring, said series coil if energized then assisting said spring to hold said armature in its biased position.

3. A battery charging system comprising a generator, a switch for controlling the connection of said generator in a charging circuit with the battery, an E-shaped magnet core, a pivotally mounted armature for controlling said switch having its ends selectively movable into attracted positions toward the two outer legs of said core, means for biasing said armature to a first attracted position toward a first of said outer legs to effect the opening of said switch, a voltage coil on the second of said outer legs responsive to the voltage of said generator for producing a first flux in said second and middle legs tending to operate said armature against its bias toward said second outer leg to its second attracted position and for producing a second flux in said second and first legs tending to hold said armature in said first attracted position, and a differential voltage coil on said first outer leg connected across said switch arranged to assist said second flux when the generator voltage is less than the voltage of the battery thereby to hold said armature in said first position but to oppose said second flux when the generator voltage exceeds the battery voltage thereby to effect movement of said armature against its bias by said voltage coil to its second attracted position to effect the closure of said switch for closure of said charging circuit.

4. A battery charging system comprising a generator, a switch for connecting said generator in a charging circuit with the battery, a three-legged magnet core, a pivotally mounted armature for controlling said switch, a spring for biasing said armtaure to a first attracted position toward a first of said legs to open said switch, a voltage coil on a second of said legs responsive to the voltage of said generator for producing a flux in said second and third legs tending to move said armature to its other attracted position against said spring to close said switch for closure of said charging circuit, and a series coil connected in said circuit mounted on said third leg and arranged in response to a battery discharge current to oppose said voltage coil and cause movement of said armature to said first attracted position by said spring to open said switch and then produce a flux in said third and first legs to hold said armature in said first attracted position regardless of the value of said discharge current in the event that said discharge current reaches a high value.

5. A battery charging system comprising a generator, a switch for controlling the connection of said generator in a charging circuit with a battery, a three-legged magnet core, an armature for controlling said switch pivoted adjacent the middle leg of said core with its ends respectively movable into attracted positions towards the two outer legs of said core, a spring for biasing said armature to a first attracted position toward a first of said outer legs for opening of said switch, a voltage coil on the second of said outer legs responsive to the voltage of said generator for producing a flux in said second and middle legs tending to move said armature against said spring to its second attracted position for closure of said switch and said charging circuit, and a series coil connected in said charging circuit mounted on said middle leg and arranged in response to a battery charging current to produce a flux in said second and middle legs to assist said voltage coil in holding said armature in said second attracted position but in response to a battery discharge current to oppose said voltage coil and cause movement of said armature by said spring to said first attracted position for opening of said charging circuit and then in the event said charging circuit remains closed for producing a flux in said middle and first legs to hold said armature in said first attracted position regardless of the value of said discharge current.

6. A battery charging system comprising a generator, a switch for connecting said generator in a charging circuit with the battery, a three-legged magnet core, a pivotally mounted armature for controlling said switch, a spring for biasing said armature to a first attracted position toward a first of said legs to effect the opening of said switch, a voltage coil on a second of said legs responsive to the voltage of said generator for producing a first flux in said second leg and the third leg tending to operate said armature against said spring toward said second leg to a second attracted position and for producing a second flux in said second and first legs tending to hold said armature in said first attracted position, a differential voltage coil on said first leg connected across said switch arranged to oppose said second flux when the generator voltage exceeds the battery voltage thereby to effect movement of said armature against said spring by said voltage coil for closure of said switch, a series coil connected in said charging circuit mounted on said third leg arranged in response to a battery discharge current to oppose said voltage coil to cause movement of said armature by said spring to said first position and in the event of continuance of discharge current for producing a flux in said first and third legs to hold said armature in said first attracted position regardless of the value of said discharge current.

7. A battery charging system comprising a generator, a switch for controlling the connection of said generator in a charging circuit with a battery, an E-shaped magnet core, an armature for controlling said switch pivoted adjacent the middle leg of said core with its ends respectively movable into attracted positions toward the two outer legs of said core, means for biasing said armature to a first attracted position toward a first of said outer legs to effect the opening of said switch, a voltage coil on the second of said outer legs responsive to the voltage of said generator for producing a first flux in said second and middle legs tending to operate said armature against its bias toward said second outer leg to its second attracted position and for producing a second flux in said first and second legs tending to hold said armature in said first attracted position, a differential voltage coil on said first outer leg connected across said switch arranged to assist said second flux when the generator voltage is less than the voltage of the battery but to oppose said second flux when the generator voltage exceeds the battery voltage thereby to effect movement of said armature against its bias by said voltage coil to its second attracted position to effect the closure of said switch for closure of said charging circuit, and a series coil connected in said charging circuit mounted on said middle leg and arranged in response to a battery charging current to assist said voltage coil in holding said armature in said second attracted position but in response to a battery discharge current to oppose said voltage coil to cause movement of said armature by said spring to said first attracted position to effect the opening of said charging circuit and in the event of continuance of discharge current for producing a flux in said first and middle legs to hold said armature in said first attracted position regardless of the value of said discharge current.

8. A battery charging system comprising a generator, a switch for connecting said generator in a charging circuit with the battery, a three-legged magnet core, a pivotally mounted armature for controlling said switch, a spring for biasing said armature to a first attracted position toward a first of said legs to effect the opening of said switch, a voltage coil on a second of said legs responsive to the voltage of said generator for producing a first flux in said second leg and the third leg tending to operate said armature against said spring toward said second leg to a second attracted position and for producing a second flux in said second and first legs tending to hold said armature in said first attracted position, a differential voltage coil on said first leg connected across said switch arranged to oppose said second flux when the generator voltage exceeds the battery voltage thereby to effect movement of said armature against said spring by said voltage coil for closure of said switch, means responsive to the closure of said switch for energizing said differential coil in a direction to hold said armature in said first position, and a series coil connected in said charging circuit mounted on said third leg arranged in response to a battery discharge current to oppose said voltage coil to effect movement of said armature by said spring to said first position, said series coil being energized in response to continued discharge current to assist said differential coil in holding said armature in said first position.

GUY BELLOWS, Jr.